United States Patent [19]
Zukowski

[11] 4,284,738
[45] Aug. 18, 1981

[54] ETHYLENE-PROPYLENE BLOCK COPOLYMERIZATION PROCESS AND PRODUCT

[75] Inventor: Edward A. Zukowski, Clark, N.J.

[73] Assignee: El Paso Polyolefins Company, Paramus, N.J.

[21] Appl. No.: 177,296

[22] Filed: Aug. 11, 1980

[51] Int. Cl.³ .................................... C08F 297/08
[52] U.S. Cl. ................................ 525/247; 525/53; 525/243
[58] Field of Search .................. 525/243, 247, 323

[56] References Cited

U.S. PATENT DOCUMENTS

| | | | |
|---|---|---|---|
| 3,318,976 | 5/1967 | Short | 525/247 |
| 3,401,212 | 9/1968 | Griffin | 525/243 |
| 3,514,501 | 5/1970 | Leibson et al. | 525/53 |
| 3,732,335 | 5/1973 | Hermans et al. | 525/247 |
| 3,830,787 | 8/1974 | Susa et al. | 260/94.9 |
| 3,917,746 | 11/1975 | Aishima et al. | 525/247 |
| 3,953,414 | 4/1976 | Galli et al. | 526/342 |
| 4,051,313 | 9/1977 | Luciani et al. | 526/496 |
| 4,115,319 | 9/1978 | Scata et al. | 252/429 B |
| 4,128,606 | 12/1978 | Furutachi et al. | 525/247 |
| 4,149,990 | 4/1979 | Giannini et al. | 252/429 B |

*Primary Examiner*—Stanford M. Levin
*Attorney, Agent, or Firm*—Fred S. Valles; Margareta LeMaire

[57] ABSTRACT

A process for the preparation of ethylene-propylene block copolymers at high catalyst productivity rates resulting in polymer products having improved impact strength-polymerized ethylene content relationship. The improvement is obtained by reacting preformed propylene prepolymer still containing active catalyst residues with ethylene and propylene in a vapor phase reaction zone in the presence of additional aluminum trialkyl catalyst component introduced to the reaction zone. The polymer produced by the process exhibits excellent physical and mechanical properties.

24 Claims, No Drawings

ETHYLENE-PROPYLENE BLOCK COPOLYMERIZATION PROCESS AND PRODUCT

BACKGROUND OF THE INVENTION

In block polymerization, there is substantially effected a combination of the best physical and chemical properties of two or more polymers, for example, the combination of those of polypropylene with those of polyethylene. Thus, polyethylene, while not possessing melting points or tensile strengths as high as those of polypropylene, does in fact possess excellent low temperature properties such as bittleness and impact. When the outstanding properties of both of these polymers are combined in the technique of block polymerization, there results at once a heteropolymer useful in many applications for which neither homopolymer was practically useful.

A group of block copolymers, which have excellent physical properties, are the ethylene-propylene block copolymers, e.g. those of the type P-EP, where P denotes a propylene homopolymer preblock and EP is a post-block of ethylene-propylene copolymer. By varying the proportions of the blocks and the polymerized ethylene content, the physical properties can be closely controlled to fit the particular application for which the polymer products are intended. In general, at constant melt flow rates the impact strength at room temperature of the block copolymer is substantially directly proportional to the amount of polymerized ethylene in the total product.

Block copolymers are advantageously produced on a commercial scale by the process disclosed in U.S. Pat. No. 3,514,501. Briefly, this process involves preparation of the preblock, preferably in the liquid phase, by catalytic polymerization of propylene in a hydrocarbon diluent such as liquid propylene to form a slurry. After separation of the slurry, the prepolymer which still contains active catalyst residues is introduced into at least one reaction zone, where it is reacted with monomer vapors for a sufficient period of time to form the polymer post block onto the polymer preblock in the desired proportions.

In the past, the conventional catalyst system used in such a polymerization process has been an unmodified or an electron donor-modified titanium halide component, activated with an organoaluminum cocatalyst. Typical examples of conventional propylene polymerization catalyst systems include cocrystallized titanium trichloride-aluminum trichloride catalysts of the general formula $n.TiCl_3.AlCl_3$ activated with diethyl aluminum chloride or triethyl aluminum. The cocrystallized titanium trichloride-aluminum trichloride can have been subjected to a modification treatment with a suitable electron donor compound to increase its activity or stereospecificity. Such compounds include phosphorus compounds, ester of inorganic and organic acid ethers and numerous other compounds.

One major drawback, however, in using the aforementioned conventional catalysts, has been the low catalyst productivity, which has necessitated the subsequent deashing of the product to reduce the content of catalyst residues, which otherwise would detrimentally affect the product quality.

Recently new catalysts have been developed which are far more active than the aforementioned conventional catalysts in the polymerization of alpha-olefins. Briefly described, these catalysts are comprised of a titanium halide catalyst component supported on magnesium dihalide and an alkylaluminum compound, which can be present as a complex with an electron donor compound. These catalyst components have been described in the patent literature, e.g. in U.S. Pat. Nos. 3,830,787, 3,953,414, 4,051,313, 4,115,319 and 4,149,990.

The productivities obtained with these new catalysts are extremely high resulting in polymers containing such small quantities of residual catalyst that the conventional deashing step can be dispensed with. The catalysts function well in the homopolymerization of propylene and in the copolymerization of a mixture of propylene and another alpha-olefin such as ethylene, provided that the polymerization reaction is carried out in a liquid diluent, e.g. liquid propylene monomer. However, in the vapor phase polymerization used in preparing the EP copolymer block of P-EP block copolymer described above, using conventional operating conditions, it has been found that the product quality of the resulting block polymer has been substantially inferior. Specificially, in order to achieve a desired impact strength at a desired melt flow, it was found that considerably more ethylene had to be incorporated into the total polymer than is the case when employing conventional catalysts. The necessary increase in ethylene content to achieve the impact strength detrimentally affects other desirable properties of the final product such as stiffness, heat deflection temperature, tensile properties, etc.

As disclosed in copending U.S. patent application Ser. No. 64,961 filed July 27, 1979, significant improvements in impact strength can be achieved when the vapor phase polymerization is carried out with a monomer feed having an ethylene-to-propylene molar ratio in the narrow range of from about 0.15 to about 0.3.

However, it has been found that at these rather low molar ratios, the total amount of ethylene that can be incorporated into the final product is somewhat restricted. Thus, the aforementioned improved process has been limited to the production of relatively low impact strength materials.

It is therefore an object of the present invention to provide a highly efficient process for the vapor phase polymerization of ethylene-propylene blocks onto a preformed propylene polymer yielding medium to high-impact grade polymer products without significantly affecting other desirable physical polymer properties.

Another object of the invention is to provide a process for the preparation of ethylene-propylene block copolymers wherein the polymerized ethylene content of the total polymer product is minimized to achieve a desired impact strength.

Still another object of the present invention is to provide a novel ethylene-propylene block copolymer which exhibits improved processability when extruded or injection molded as compared to conventional ethylene-propylene block copolymers of the same total ethylene content.

Another object of the present invention is to provide a novel ethylene-propylene block copolymer which can be processed at lower extrusion or molding temperatures and/or lower extrusion or molding pressures than conventional resins of the same meltflows and total ethylene content.

Further objects will become apparent from a reading of the specification and appended claims.

THE INVENTION

The above objects are accomplished in a continuous sequential vapor phase block copolymerization process which comprises:

(A) providing a preformed propylene polymer in finely divided form, said preformed polymer containing active catalyst residues and having been prepared by polymerizing propylene in the presence of a catalyst composition containing the components
   (a) an aluminum trialkyl or an aluminum trialkyl at least partially complexed with an electron donor compound, and
   (b) titanium tri- or tetrahalide supported on magnesium dihalide, or a complex of a titanium tri- or tetrahalide with an electron donor compound supported on magnesium dihalide, the components (a) and (b) being provided in a molar ratio of Al/Ti between about 10 and 200;

(B) introducing said preformed polymer, ethylene and propylene into at least one continuously agitated reaction zone, (C) introducing an additional quantity of component (a) to said reaction zone, said quantity ranging from about 5 to about 50% of the quantity provided in the preparation of the prepolymer; and (D) polymerizing said ethylene and propylene monomers in the vapor phase in the reaction zone onto said preformed propylene prepolymer.

It was discovered that unexpectedly the additional introduction of trialkyl aluminum to the reaction zone causes the formation of longer post blocks of highly randomized ethylenepropylene copolymers. The block copolymer products of the overall process exhibit much higher impact strengths than could be achieved in a process carried out under identical conditions except for no secondary trialkyl aluminum additions. The improvements are not, as one might expect, merely the result of remedying a deficiency in the overall quantity of trialkyl aluminum within the process. To the contrary, it has been found that less than conventional total quantities of trialkyl aluminum can be used with advantage in the process of this invention.

Propylene, optionally in admixture with minor amounts of other alpha-olefins of from about 2 to 10 carbon atoms or more can be employed to form the prepolymer. Such other alpha-olefins include ethylene, butene-1, isobutene-1, pentene-1, hexene-1, and higher, as well as branched alpha-olefins such as 2-methyl butene-1, 4-methyl pentene-1 and higher. Of these monomers, propylene and mixtures of propylene and ethylene are of special interest and most preferred. When ethylene is a component, it is preferred that it be limited to a concentration of not more than about 2 wt % of the total monomer feed.

The prepolymer is formed in a reaction zone employing a hydrocarbon diluent and a catalyst for the polymerization, carrying out the polymerization to a solids content of from 5 to 60%, but preferably 20 to 40%. The preferred diluent is liquid propylene.

In the preferred process for the prepolymer formation, i.e. the well know "liquid pool" process, the propylene functions as the liquid diluent as well as feed to the reaction, except for small quantities of inert hydrocarbons, e.g. hexane, mineral oil, petrolatum, etc., that may be used for the introduction of the catalyst components into the reaction zone.

The reaction is continuous and monomer feed and catalyst components are continuously fed to the reactor and a slurry of polymer product and liquid propylene is withdrawn, preferably through a cyclic discharge valve which simulates continuous operation. Various modifiers such as hydrogen may be added to alter the properties of the polymer product. Such modifiers are well known in the art and need not be discussed in any further detail since they form no part of this invention.

The catalyst components used in the process for preparing the prepolymer can be any one of the recently developed, high activity magnesium halide supported catalyst component and organoaluminum cocatalyst components disclosed e.g. in U.S. Pat. Nos. 3,830,787, 3,953,414, 4,051,313, 4,115,319, and 4,149,990, hereby incorporated in this application by reference.

Typically, such a catalyst composition is a two component composition where the components are introduced separately into the polymerization reactor. Component (a) of such a composition is advantageously selected from trialkyl aluminums containing from 1 to 8 carbon atoms in the alkyl group, such as triethyl aluminum, trimethyl aluminum, tri-n-butyl aluminum, triisobutyl aluminum, triisohexyl aluminum, tri-n-octyl aluminum and tri-isooctyl aluminum. Most preferably, the trialkyl aluminum is complexed with an electron donor prior to introduction into the polymerization reactor. Best results are achieved when esters of carboxylic acids or diamines, particularly esters of aromatic acids are used as the electron donors.

Some typical examples of such compounds are methyl- and ethylbenzoate, methyl- and ethyl-p-methoxybenzoate, diethylcarbonate, ethylacetate, dimethylmaleate, triethylborate, ethyl-o-chlorobenzoate, ethyl-naphthenate, methyl-p-toluate, ethyl-toluate, ethyl-p-butoxy-benzoate, ethyl-cyclohexanoate, ethyl-pivalate, N,N,N',N'-tetramethylenediamine, 1,1,4,-trimethylpiperazine, 2,5-dimethylpiperazine and the like. The molar ratio of aluminum alkyl to electron donor can range between 1 and 100, preferably between 2 and 5. Solutions of the electron donor and the trialkyl aluminum compound in a hydrocarbon such as hexane or heptane are preferably prereacted for a certain period of time generally less than 1 hour prior to feeding the mixture into the polymerization reaction zone.

The other component of the catalyst composition is either a titanium tri- or tetrahalide supported on magnesium dihalide, or a complex of a titanium tri- or tetrahalide with an electron donor compound supported on magnesium dihalide. The halogen in the respective halides can be chlorine, bromine or iodine, the preferred halogen being chlorine. The electron donor, if it is used in forming a complex, is suitably selected from the esters of inorganic and organic oxygenated acids and the polyamines. Examples of such compounds are the esters of aromatic carboxylic acids, such as benzoic acid, p-methoxybenzoic acid and p-toluic acids and particularly the alkyl esters of said acids; the alkylene diamines e.g. N',N'',N''',N''''-tetramethylethylenediamine. The magnesium to electron donor molar ratio are equal to or higher than 1 and preferably between 2 and 10. Generally the titanium content expressed as titanium metal ranges between 0.1 and 20 wt % in the supported catalyst component and preferably between 1 and 3 wt %.

The preparation of such supported catalyst components has been described in the prior art and are commercially available.

The catalyst components (a) and (b) are fed to the prepolymer reaction zone in amounts such that the Al/Ti molar ratio is maintained preferably between about 10 and 200. The monomer feed to Ti metal weight ratio is usually in the range of 500,000 and 1,500,000.

Temperatures at which the prepolymer formation can be carried out are those known in the art, for example, from 50° to 250° F., preferably from 115° to 165° F. and most peferably from 125° F. to about 155° F. The pressures in the prepolymer formation can range from atmospheric or below where normally liquid inert hydrocarbon diluents are used (heptane or hexane) to pressures up to 500 psig or higher where propylene is used as its own dispersing agent or the propylene in admixture with a normally gaseous hydrocarbon diluent such as propane or butane, which are liquid under the conditions of the reaction.

The prepolymer from the reaction zone is taken to a separation zone, such as a cyclone or a bag filter, wherein the volatile constituents are separated from the polymer and processed according to known techniques and recycled to the reaction zone, the amount of volatiles removed being sufficient so that less than 10% and preferably no more than 5% volatile content remains in the prepolymer.

In the vapor phase block polymerization, the polymer recovered from the separation zone and containing active catalyst residues, is taken to a continuously agitated reaction zone having provisions for introducing additional quantity of trialkyl aluminum, the ethylene monomer and propylene monomer at one or more points along the length of the zone (and inert gasses such as nitrogen) so that the active catalyst residues in the prepolymer and the added trialkyl aluminum catalyst component cause said monomers to polymerize to a block thereby modifying the ultimate properties of the resin produced. The polymerization in the continuously agitated reaction zone is generally carried out at pressures lower than those used for the prepolymer preparation, i.e. pressures of 10 to 50 psig or somewhat higher. Polymerization temperatures can range, for example, from about 50° F. to about 210° F., but preferably from about 130° to about 200° F.

The ethylene and propylene monomers do not require premixing prior to introduction into the vapor phase zone; in fact, it is more advantageous to separately introduce each of the monomers at once or preferably several points along the reactor length. Preferably, propylene is introduced as a liquid which upon vaporization will remove some of the heat of polymerization generated in the reaction zone.

The additional amount of trialkyl aluminum is usually introduced near the reactor inlet, e.g. in admixture with one of the monomer feed streams such as liquid propylene.

The molar ratio of the total ethylene to total propylene introduced to the reaction zone is usually maintained at a value of at least within the range of from about 0.15, and preferably, between about 0.2 and about 0.4.

The trialkyl aluminum catalyst components may, if desired, be complexed with any of the aforementioned electron donors suited for such complexing. It is usually added in quantities of from about 5 to about 50% of that added in the polymerization of the prepolymer and preferably the additions amount to between about 10 and about 35%.

Generally from about 5 to about 40 percent by weight of block based on the weight of the total polymer is produced in the total block polymerization reactor system.

Suitable continuously agitated reaction zones include those disclosed in U.S. Pat. No. 3,514,501, incorporated into this application by reference. The reaction zone can be one or more pipe line reactors in series with optional jacketing for heat removal and suitable monomer introduction points as well as agitating means. According to the preferred embodiment of this invention, one or more horizontal ribbon blender reactors are provided for the continuous operation. Such reactors are equipped internally with a series of ribbon blades and/or paddles rotated by a power drive. By suitable arrangement of the agitation equipment, the polymer can be moved continuously from the inlet to the outlet. The polymer powder substantially independent of any agitation, behaves much like a fluid and "flows" or moves from the inlet end of the reactor to the outlet end, that is, flows along the length of the reactor in much the same manner as a fluid like a liquid would.

Propylene is provided at least to the inlet of the reactor and if liquid propylene monomer is used, it is preferably also provided through inlet spray nozzles spaced along the upper portion of the reactor. Ethylene monomer feed in vapor form can be introduced in similar fashion at points along the length of the reactor. The reactor is advantageously provided with an external cooling jacket for removal of heat through the reactor wall. Additional vapor-phase reactors can be provided in series with the block polymerization reactor for the purpose of increasing residence time. If desired, any of the various known modifiers may be added to one or more reactor for their intended purpose.

Because of the generally high productivity of the supported catalyst system expressed in terms of pounds of polymer produced per pound of titanium metal, which productivity has been further enhanced by the present invention, there is no need to remove catalyst residues from the polymer in a deashing step as is the case with conventional catalyst.

The polymer products provided in accordance with this invention have a meltflow range between about 0.1 and about 10 g/10 min., ratio of weight-average molecular weight to number-average molecular weight of above about 6.5, ethylene content of at least about 1, preferably above about 4 wt %, Ti content not exceeding about 3 ppm, Mg content not exceeding about 40 ppm, Cl content not exceeding about 100 ppm and total ash content not exceeding about 400 ppm.

Specific advantages of the polymers of this invention compared to conventional polymers include wider processability range, lower processing energy requirements, superior ability to fill thin sections and multiple cavity molds, better drawdown, easier drawability and higher processing speed in the continuous filament and staple fiber production.

For example, based on spiral meltflow measurements, it was found that polymers of this invention having meltflows (ASTM-1238 Condition L) in the range of about 2–10 g/10 min. can be processed at 50°–30° F. lower molding temperatures, or 350–150 psi lower molding pressures than conventional polymers of the same meltflows (ASTM-1238) and total ethylene content.

It is believed that the molecular weight distribution, Mw/Mn is the property that best relates to the improvements in impact strength as well as polymer rheological properties and processability. Typically, polymerization with a conventional catalyst system would result in a polymer product having a Mw/Mn ratio of at most 6.5 and generally below 6, while the polymers of this invention have Mw/Mn ratios of at least 6.5, e.g. between about 7 and about 10.

Various additives can, if desired, be incorporated into the polypropylene resin, such as fibers, fillers, antioxidants, metal deactivating agents, heat and light stabilizers, dyes, pigments, lubricants and the like.

The polymers can be used with advantage in the manufacture of fibers, filaments and films by extrusion; of rigid articles by injection molding; and of bottles by blow molding techniques.

The following examples further illustrate the advantages obtained by the invention.

EXAMPLES 1-3

The experiments were conducted in large scale continuous pilot plant operations. For the prepolymer preparation, propylene and catalyst components were continuously charged to a stirred reactor, the monomer feed rate was adjusted corresponding to the reactor residence times indicated in Table 1. The organoaluminum compound of the catalyst system was a heptane solution of either triisobutyl aluminum (TIBA) or triethyl aluminum (TEA). The trialkyl aluminum compounds had been treated prior to introduction into the reactor with heptane solution of methyl-p-toluate (MPT), an electron donor compound. The solid supported titanium halide catalyst component was a commercially available catalyst (FT-1) obtained from Montedison, S.p.A., Milan, Italy. The supported catalyst component contained about 1.5 wt % titanium, 20.3 wt % magnesium, 60.0 wt % chlorine and 9.6 wt % hydrocarbon volatiles. Ethylbenzoate had been used in the manufacture of the supported catalyst component. The two catalyst components were added at rates directly proportional to the polymer production rates and in amounts sufficient to maintain a polymer solids concentration in the reactor slurry at a nominal value of about 40%. The catalyst productivity (1000 lb polymer/lb of Ti metal) was calculated in each case from the polymer slurry withdrawal rate, solids content in the slurry and the titanium catalyst component addition rate.

After separation from unreacted propylene, the prepolymer was fed sequentially to two serially connected, water-cooled jacketed horizontal reactors, each provided with ribbon blades as agitation means. In each reactor, the residence time was maintained at 2 hours. Propylene was introduced as a liquid to the first reactor and in gaseous form to the second reactor near the inlet of each of the reactors, and ethylene monomer through three inlets spaced evenly across each of the reactors. Additional organoaluminum compound (no pretreatment with MPT) was introduced with the liquid propylene to the first horizontal reactor. The block copolymer product was recovered from the outlet of the second reactor. The operating conditions in each of the reactors were essentially the same. No additional trialkyl aluminum compound was added in the Comparative Example 1. The improvement in impact strength by the addition of trialkyl aluminum to the vapor phase reaction zone is demonstrated in Example 2 (TIBA) and Example 3 (TEA).

TABLE 1

| EX. NO. | COMP. 1 | 2 | 3 |
|---|---|---|---|
| Prepolymer Prod. | | | |
| Temp. - °F. | 130 | 130 | 130 |
| Pressure - psi | 340 | 340 | 340 |
| Al/Ti mol/mol | 150 | 150 | 150 |
| Alkyl | TIBA | TIBA | TEA |
| Alkyl/MPT - mol/mol | 2.8 | 2.8 | 2.8 |
| Res. time - hrs. | 2.0 | 1.7 | 1.7 |
| Productivity - 1000 lbs/lb Ti | 374 | 351 | 220 |
| Vapor phase block poly. (5) | | | |
| Temp. - °F. | 200 | 200 | 200 |
| Pressure - psig | 40 | 40 | 40 |
| Ethylene/Propylene - mol/mol | 0.3 | 0.3 | 0.3 |
| Additional alkyl - % of initial | 0 | 33 | 17 |
| Block copolymer product | | | |
| Ethylene content - wt % | 2.5 | 3.6 | 8.1 |
| Melt flow - g/10 min. (1) | 1.8 | 2.2 | 2.5 |
| Notched Izod - ft. lb/in (2) | 1.5 | 3.5 | 3.5 |
| Tensile Strength | | | |
| @ Yield - psi (3) | — | 3280 | 3560 |
| @ Break - psi (3) | — | (4) | 2816 |
| Elongation at Break % (3) | — | 740 | 721 |
| Tensile Modulus psi × 10⁵ (3) | — | 1.31 | 1.48 |

(1) ASTM D1238, Cond. L
(2) ASTM D256
(3) ASTM D638
(4) Exceeded test limits
(5) No second reactor

EXAMPLES 4 and 5

In these examples, the general polymerization techniques of Examples 1-3 were followed except that ethylene was also fed to the prepolymer reactor in amounts sufficient to prepare a random copolymer preblock containing about 2.5 wt % polymerized ethylene. The specific operating conditions used and resulting polymer properties are shown in Table 2. Again, the benefits of the addition of trialkyl aluminum to the vapor phase block copolymerization zone is apparent from a comparison of the data of Example 5 (17% addition) with those of comparative Example 4 (no addition). Table 3 lists the results of detailed analyses of the polymer product of Example 5.

TABLE 2

| EX. NO. | COMP. 4 | 5 |
|---|---|---|
| Prepolymer Prod. | | |
| Temp. - °F. | 130 | 130 |
| Pressure - psi | 340 | 340 |
| Al/Ti mol/mol | 150 | 150 |
| TEA/MPT - mol/mol | 3.1 | 3.1 |
| Res. time - hrs. | 1.7 | 1.7 |
| Productivity - 1000 lbs/lb Ti | 293 | 437 |
| Vapor phase block polym. | | |
| Temp. - °F. | 175 | 175 |
| Pressure - psig | 40 | 40 |
| Ethylene/Propylene - mol/mol | 0.3 | 0.3 |
| Additional alkyl - % of initial | — | 17 |
| Block copolymer product | | |
| Ethylene content - wt % | 4.8 | 8.2 |

TABLE 3

| Example No. | 5 |
|---|---|
| Melt Flow g/10min. (1) | 2.1 |
| Density gm/cc (2) | 0.895 |

TABLE 3-continued

| Example No. | 5 |
|---|---|
| Mn | 38,000 |
| Mw | 325,000 |
| Mw/Mn | 8.6 |
| Tensile Strength | |
| @ Yield - psi (3) | 3530 |
| @ Break - psi (3) | 3015 |
| Elongation at Break - % (3) | 485 |
| Flexural Modulus - psi × 10⁵ (4) | 1.16 |
| Tensile Modulus - psi × 10⁵ (3) | 1.29 |
| HDT - at 66 psi °C. (5) | 80 |
| Crystalline Melting Point - °C. | 162 |
| Hardness (Rockwell) (6) | 38.4 |
| LTB - °C. (7) | −20.4 |
| Izod Impact ft lbs/in (8) | 5.4 |
| Polymer Impurities: | |
| Ash - ppm | 350 |
| Mg - ppm | 33 |
| Ti - ppm | 2 |
| Cl - ppm | 95 |
| Al - ppm | 194 |

(1) ASTM D1238, Cond. L
(2) ASTM D1505
(3) ASTM D638
(4) ASTM D790
(5) ASTM D648
(6) ASTM D785
(7) ASTM D746
(8) ASTM D256

As indicated in Table 3, standard ASTM test methods were used to determine the majority of the properties of the polymer products.

The Mw/Mn ratio was determined by liquid chromatography using o-dichlorobenzene as solvent.

The contents of Ti, Mg and Al were determined by atomic absorption analysis of polymer ash dissolved in hydrochloric acid and the chlorine content by colorimetric determination of combusted polymer sample using a Parr oxygen bomb.

It is obvious to those skilled in the art that many variations and modifications can be made to the process and the block copolymer of this invention. All such departures from the foregoing specification and considered within the scope of this invention as defined by the specification and the appended claims.

What is claimed is:

1. A continuous sequential vapor phase block copolymerization process for the production of impact resistant ethylenepropylene polymers at high productivity rates, which comprises:
   (A) providing a preformed propylene polymer in finely divided form, said preformed polymer containing active catalyst residues and having been prepared by polymerizing propylene in the presence of a catalyst composition containing the components
   (a) an aluminum trialkyl or an aluminum trialkyl at least partially complexed with an electron donor compound, and
   (b) titanium tri- or tetrahalide supported on magnesium dihalide, or a complex of a titanium tri- or tetrahalide with an electron donor compound supported on magnesium dihalide, the components (a) and (b) being provided in a molar ratio of Al/Ti between about 10 and about 200;
   (B) introducing said preformed polymer, ethylene and propylene into at least one continuously agitated reaction zone,
   (C) introducing an additional quantity of component (a) to said reaction zone, said quantity ranging from about 5 to about 50% of the quantity in the preparation of the prepolymer; and
   (D) polymerizing said ethylene and propylene monomers in the vapor phase in the reaction zone onto said preformed propylene prepolymer.

2. A process according to claim 1, wherein the preformed propylene polymer is produced in a polymerization zone under sufficient pressure to maintain propylene in liquid phase.

3. A process according to claim 1, wherein the preformed propylene polymer is propylene homopolymer.

4. A process according to claim 1, wherein the preformed propylene polymer is a random copolymer of ethylene and propylene.

5. A process according to claim 1, wherein the ethylene and propylene monomers are introduced in a molar ratio of ethylene to propylene of from about 0.2 to about 0.4.

6. A process according to claim 1, wherein the aluminum trialkyl is one containing from 1 to 8 carbon atoms in the alkyl groups.

7. A process according to claim 1, wherein the aluminum trialkyl is triisobutyl aluminum.

8. A process according to claim 1, wherein the aluminum trialkyl is triethyl aluminum.

9. A process according to claim 1, wherein the electron donor compound of component (a) of the catalyst composition is an ester of a carboxylic acid or a diamine.

10. A process according to claim 9, wherein said electron donor is an ester of an aromatic acid.

11. A process according to claim 10, wherein the ester is methyl-p-toluate.

12. A process according to claim 1, wherein the molar ratio of trialkyl aluminum to electron donor ranges between about 1 and about 100.

13. A process according to claim 12, wherein the molar ratio is between about 2 and about 5.

14. The process of claim 1, wherein component (a) is prepared by prereacting the aluminum trialkyl with the electron donor for less than one hour prior to polymerization.

15. The process of claim 1, wherein the titanium tri- or tetrahalide is a titanium trichloride or titanium tetrachloride.

16. The process of claim 1, wherein the magnesium dihalide is magnesium dichloride.

17. The process of claim 1, wherein the electron donor compound of component (b) is a polyamine or an ester of an inorganic or an organic oxygenated acid.

18. The process of claim 17, wherein said electron donor is an ester of an aromatic carboxylic acid.

19. The process of claim 18, wherein the ester is ethylbenzoate.

20. The process of claim 1, wherein the magnesium to electron donor molar ratio of component (b) is at least about 1.

21. The process of claim 20, wherein said molar ratio is between about 2 and about 10.

22. The process of claim 1, wherein the titanium content expressed as titanium metal ranges between about 0.1 and about 20 weight percent in the supported catalyst component (b).

23. The process of claim 22, wherein the titanium content is between about 1 and about 3 weight percent.

24. A process according to claim 1, wherin step (D) is carried out at a temperature of from about 50° F. to about 210° F.

* * * * *